June 23, 1925.  1,543,202
G. W. BERRY
APPARATUS FOR TRIMMING AND SHAPING HOLLOW ARTICLES
Filed March 20, 1925    2 Sheets-Sheet 1
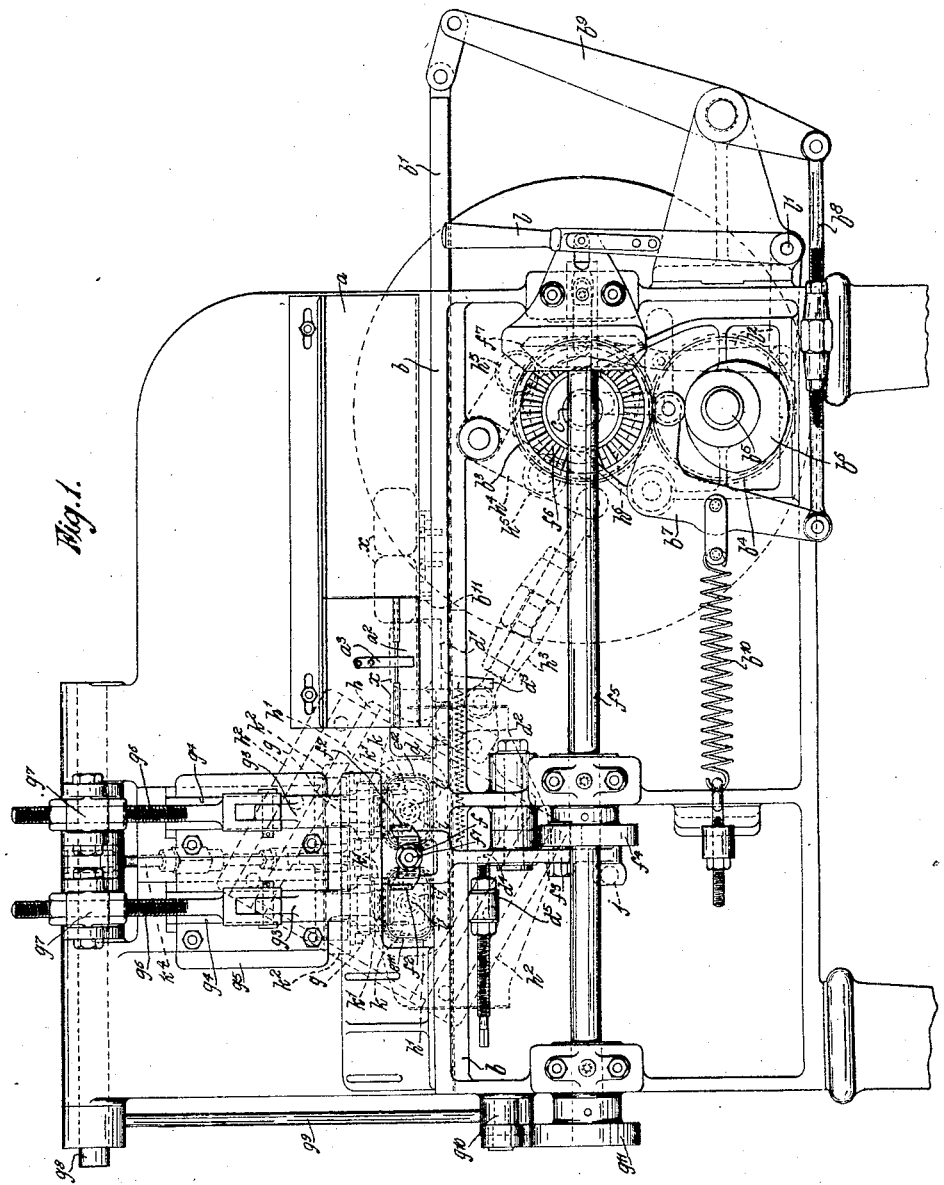
Inventor.
George William Berry.
Attorney.

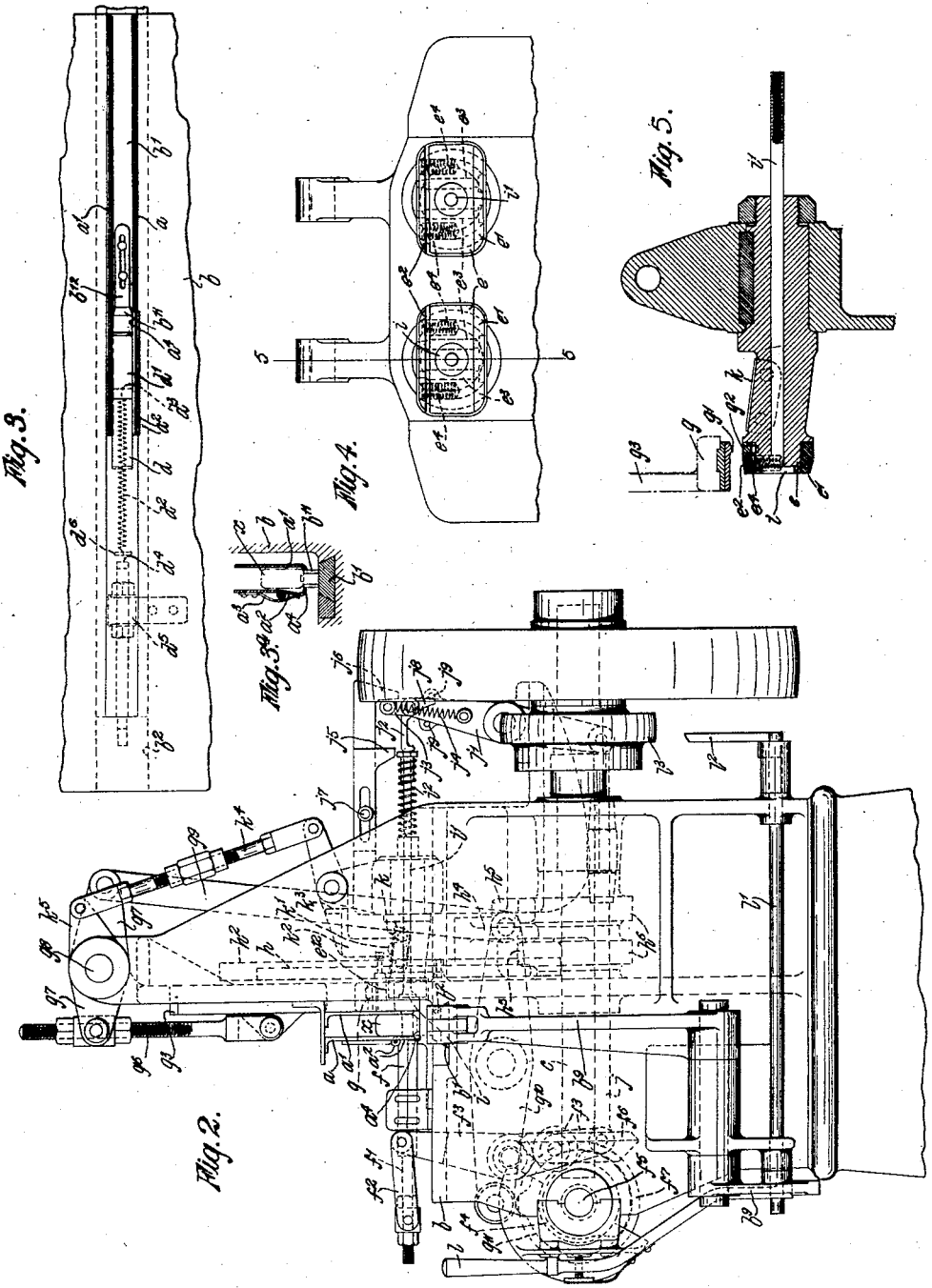

Patented June 23, 1925.

1,543,202

UNITED STATES PATENT OFFICE.

GEORGE WILLIAM BERRY, OF LEEDS, ENGLAND.

APPARATUS FOR TRIMMING AND SHAPING HOLLOW ARTICLES.

Application filed March 20, 1925. Serial No. 17,002.

*To all whom it may concern:*

Be it known that I, GEORGE WILLIAM BERRY, residing at Leeds, in the county of York, England, a subject of the King of Great Britain and Ireland, have invented Apparatus for Trimming and Shaping Hollow Articles, of which the following is a specification.

This invention relates to an apparatus for trimming and shaping hollow articles such as receptacles of sheet metal, the trimming operations being performed for example on the edges of a drawn receptacle body after leaving the draw press and the shaping required for instance for the purpose of producing protuberances such as "bulbs" or "pops" such as for receiving pintles or pins for hinging a lid to the receptacle.

The apparatus is capable of use in performing either the trimming or shaping operation separately or in conjunction, but in the following description a construction is disclosed in which both functions are embodied and co-operate.

The embodiment under consideration comprises means by which the receptacles are fed by means of a reciprocating slide to a trimming position and then acted on by one or more push members to force them on to a die or dies with their outer edges extending through apertures formed in a reciprocating knife, said apertures having cutting edges which first trim one side and end of the receptacle, the blade being then reversed to trim the other side and end, and finally returns to normal position. After trimming the receptacles are removed from the dies by ejectors extending through the dies and returned to the aforesaid slide, by which they are conveyed away from the trimming position to be delivered from the machine.

In the case of shaping or "popping" or "bulbing," the same operations take place as to feeding, placing on the lower die or dies and ejecting, but the additional operation of shaping is performed by means of one or more other co-operating upper dies or punches carrying tools co-operating with other tools on the lower die or dies, the boxes however after trimming being, if necessary, shifted on the said lower die or dies to bring them into the plane of the shaping tools.

The invention also comprises other details of construction, arrangement and combination of parts all as hereinafter set forth and specifically pointed out in the appended claims.

A construction of the apparatus for both trimming and shaping two receptacle bodies simultaneously is illustrated in the accompanying drawings in which:—

Fig. 1 is a side elevation of the complete apparatus or machine: Fig. 2 is an end view from the right of Fig. 1: Fig. 3 is a detail plan view of the feed means for the receptacle bodies: Fig. $3^a$ is a detail view of parts shown in Fig. 3: Fig. 4 is a detail elevation of part of the mechanism for ejecting the bodies from dies on which their edges are trimmed and on which they are "popped," and Fig. 5 is a section on line 5—5 of Fig. 4.

The receptacle bodies $x$ which for the sake of brevity are hereinafter termed "boxes" are intermittently fed by other means (not shown) in contact with one another as indicated in Fig. 1 between guiding members comprising for example two lateral plates $a$, $a^1$ adjustably mounted on the bed $b$ of the machine. One of said guide plates, for example $a$, is provided at its lower inner end with a hinged member $a^2$ under the action of a spring $a^3$ and provided with an inturned flange $a^4$ which normally retains the boxes fed thereto from falling. The hinged member $a^2$ is adapted to be forced laterally outwards about its hinge by means of an enlarged part $b^{11}$ of a member $b^{12}$ (Fig. 3) adjustably mounted on a reciprocatory feed-slide $b^1$ mounted to slide in the bed of the machine as by means of bevelled guides $b^2$ shown in Figs. 2 and 3. The carrying member $b^{12}$ is of such dimensions as to hold the hinged member $a^2$ open during the forward movement of the slide (viz to the left in Fig. 1). The feed means mentioned are so timed that the rear boxes remain at rest until the forward boxes have passed forward from the shoes hereinafter described and the hinged member $a^2$ again closed to receive two more boxes. The required reciprocating movement of the slide $b^1$ is shown as produced by means of two intermeshing gears $b^3$, $b^4$, the former on the main drive shaft $c$ of the machine and the other on a shaft $b^5$ on which is also mounted a cam $b^6$ acting on a bell-crank lever $b^7$ connected by adjustable link and lever mechanism $b^8$, $b^9$ to the slide. The lever $b^7$ is held to the cam $b^6$ by means of a spring $b^{10}$.

The hinged guide member $a^2$ having been swung aside by the wedge face $b^{11}$ as described, permits the two foremost boxes to fall from between the plates $a$, $a^1$ on to two shoes $d$ and $d^1$, the forward shoe $d$ being fixed to the slide $b^1$ and the rearward shoe $d^1$ slidable on said slide and under the action of a spring $d^2$ attached to a pin $d^6$ on the slide and at the other end to a tail $d^3$, extending downwardly from the shoe. During the forward movement of the slide $b^1$ the said two shoes $d$ and $d^1$ each carrying a box forward in contact with one another until the said tail $d^3$ of the rear shoes engages an abutment $d^4$ threaded for adjustment in a bracket $d^5$ on the under surface of the machine bed, so that it can be variably positioned according to the size of boxes under treatment. Continued forward movement of the slide $b^1$ and the arresting of the shoe $d^1$ as described will cause the bodies to be spaced apart longitudinally of the machine, this being necessary in order to apply them in spaced relation at the die positions where the trimming and shaping operations are to take place.

After the boxes have been forced on to the dies by means hereinafter described the slide $b^1$ returns the next pair of boxes meanwhile remaining stationary. When the slide and shoes $d$ and $d^1$ have again reached normal position the next pair of boxes are fed forward by those following behind and supported by the flange $a^4$ of hinged member $a^2$ until the slide again moves forward to open the hinged member $a^2$ as previously explained.

In Fig. 1 the lower dies are indicated by the reference characters $e^{11}$ and $e^{12}$ and details of same and associated parts are illustrated in Figs. 4 and 5. The bodies having been brought to the die positions are now acted upon by a push-pad $f$ reciprocating at right angles to the path of the boxes still retained in the shoes $d$ and $d^1$, said push-pad being shown as operated by a rod $f^1$ connected by a pair of links $f^2$ to a bell-crank lever $f^3$ operated by a cam $f^4$ on a cam shaft $f^5$ which in turn is driven through bevel gearing $f^6$, $f^7$ from the main drive shaft $c$. The push pad $f$ forces the boxes from the shoes $d$, $d^1$ on to the lower dies, the pad being preferably resiliently mounted on the rod $f^1$ to bring the boxes right home on the dies without shock or jar.

The said lower dies are formed of three parts, viz. a central fixed member $e$ and two side or upper and lower members $e^1$ and $e^2$, connected together by screws $e^3$ to have movement relative to the fixed member and positioned with the member $e^1$ in contact with the fixed die member and the member $e^2$ in spaced relation thereto as shown in Figure 5, by springs $e^4$ seated at opposite ends in opposed recesses in the fixed and movable die members $e$ and $e^2$ respectively so that, during the shaping operation hereinafter referred to, the movable upper die member $e^2$ (which is shaped to co-operate with an upper die $g$ reciprocatory toward and away from the die member $e^2$, to produce the pop or bulb) is adapted to recede under the pressure of said upper die member the lower movable die member $e^1$ participating in this receding movement of said upper die member $e^2$ through the connection of screws $e^3$ causing the box to have corresponding movement on the central fixed die member $e$, the die members $e^1$, $e^2$ being maintained expanded by the springs $e^4$ so that the interior of the box is filled to its full area at all times during this operation by the die members and securely held on the die.

Whilst on the lower dies the outer edges of the boxes are trimmed, this being effected as follows:—The act of forcing the boxes on to the lower dies brings their outer edges beyond the rear face of the die and into the path of a trimming device consisting of a plate $h$ movable diagonally or angularly of the die having apertures $h^1$ therethrough with sharpened edges and through which apertures the edges of the boxes project with small clearance. The blade is given reciprocating movements to first trim one side and one end of the box, and then reversed for double the extent of the first movement to trim the other side and end, being finally moved again in the first direction for half the second movement to bring it back to normal position as illustrated in Fig. 1, ready to receive further boxes at the next operation. The blade is shown as mounted in inclined guides $h^2$ and is connected by an adjustable link $h^3$ to a bell-crank lever $h^4$ having rollers $h^5$ operated by a double cam $h^6$ on the main drive shaft $c$ so that the knife is operated positively in both directions.

On completion of the trimming operation the boxes are moved partly off the dies by means of ejectors, these being in the form of plates or heads $i$ carried by rods $i^1$ extending through the lower dies and positioned within the portion of the central fixed die member $e$ engaging in the boxes during the trimming operation. The said ejectors are first operated to move the boxes for a short distance but not completely off the dies in order to bring the parts of the boxes to be shaped into the plane of the bulbing or popping tools on the lower and upper dies respectively. During this movement of the ejectors the push-pad $f$ is given a corresponding receding movement. The operation of the upper dies, as hereinafter explained, the shaping takes place and a suitable arrangement of the dies for the purpose is to provide a male tool $g^1$ on the upper die and a female tool $g^2$ fixed on the fixed part of the lower die and extending through a perforation in the movable element $e^2$ of said lower die as illustrated in Fig. 5.

The upper dies $g$ are mounted on the lower ends of slides $g^3$ movable in guides $g^4$ carried by a bracket $g^5$ on the machine frame. The said slides are shown as carried by adjustable rods $g^6$ pivoted to one end of rockers $g^7$ mounted on a cross-shaft $g^8$ at the top of the machine, the said shaft being rocked by means of a rod $g^9$ and a double-armed lever $g^{10}$ actuated by a cam $g^{11}$ on the end of the aforesaid cam shaft $f^5$.

After the shaping operation is performed, the ejectors $i$ are again operated to force the boxes completely off the dies, a further corresponding receding movement of the push-pad $f$ taking place. The said push-pad and the ejectors operate in unison, there being a connecting rod $j$ between the bell-crank $f^3$ and an ejector operating lever $j^1$ with which is associated a trip device between said lever and the ejector rods $i^1$. The said rods are under the action of springs $i^2$ tending to move them backwards out of ejecting position, and the trip device comprises a finger $j^2$ engaging the end of the ejector rod and a trip-lever $j^3$ integral therewith under the control of a spring $j^4$ and both mounted on the operating lever $j^1$. There are also mounted above the trip device two abutments $j^5$, $j^6$ which may be relatively adjustable as by means of slot and bolt connection $j^7$. The construction and operation is such that on completion of the ejecting operation the spring-controlled trip $j^3$ engages the abutment $j^5$ which forces said trip back so that its spring $j^4$ passes the dead centre. The driving connection between the operating lever $j^1$ and the ejector rod $i^1$ is thus broken allowing the ejector to be forced back by its spring $i^2$. Near the end of its return stroke the trip engages the other abutment $j^6$ which forces it together with the finger $j^2$ to cause the latter to again engage behind the ejector rod ready for a further ejecting operation. The amount of throw-over movement of the trip lever $j^3$ is limited by a tail $j^8$ thereon movable between and engaging one or other of two pins $j^9$ on the operating lever $j^1$.

The ejectors thus remove the treated boxes from the lower dies and pass them again to another part of the feed slide $b^1$, the aforementioned shoes $d$ and $d^1$, thereon having in the meantime returned to normal position to receive further boxes. The slide has an abutment (not shown) which extends behind the rearmost box received from the ejectors and pushes both boxes along again in close formation.

The material trimmed from the boxes is in the form of rings and would accumulate near the blade $h$ and dies if means were not provided to prevent this. Said means are shown as comprising an inclined knife edge $k$ adjacent each die at each side thereof on to which the rings slide as they are removed from the boxes by the blade $h$. The rings suspended on said knife edges are then cut by blades $k^1$ carried by a vertically reciprocating cross-head $k^2$ and pushed off the knife edges thereby. The cross head $k^2$ is carried by an angular lever $k^3$ rocked by means of an adjustable link $k^4$ and lever $k^5$, the latter being mounted on the upper shaft $g^8$ above mentioned.

In the drawings $l$ designates a controlling hand lever adapted to operate through rod and lever connections $l^1$, $l^2$ a safety clutch $l^3$ on the main drive shaft, this clutch being of any appropriate construction.

The mechanism described may be modified for dealing with one, two or more boxes as required for which purpose the transfer shoes, push-pads, ejectors, trimming knives and dies may be arranged accordingly or are capable of necessary adjustments.

The invention is not limited to the exact arrangement or constructions of parts herein set forth since the same may be modified within the terms of the claims which follow without departing from the spirit of the invention.

What I claim as my invention and desire to secure by Letters Patent of the United States is:—

1. In apparatus for trimming and shaping hollow articles, the combination of a die adapted to receive an article, means for successively trimming the edge of and shaping parts of said article on said die, an article conveyer operative to position an article relative to the die, means for delivering an article from the conveyer to said die, and means carried by the die within an article thereon operative to eject the article from said die after treatment.

2. In apparatus for trimming and shaping hollow articles, the combination of a die adapted to receive an article, means for successively trimming the edge of and shaping parts of said article whilst on said die, and means for altering the position of the article on the die between the trimming and shaping operation.

3. In apparatus for trimming and shaping hollow articles, the combination of a die adapted to receive an article, means for successively trimming the edge of and shaping parts of said article whilst on said die, and means for removing the article from the die after treatment, said removing means acting to shift the article on the die between the trimming and shaping operations.

4. In apparatus for trimming and shaping hollow articles, the combination of a die adapted to receive an article, means for trimming the edge of said article, means for shaping said article, both the trimming and shaping means acting on the article whilst same is on said die, and means for separating the material trimmed from the articles.

5. In apparatus for trimming and shaping hollow articles, the combination of a die adapted to receive an article, means for successively trimming the edge of and shaping parts of said article whilst on said die, means for feeding the article to said die, means for removing the article from said die after treatment, and means for separating the material trimmed from the articles.

6. In apparatus for trimming and shaping hollow articles, the combination of a plurality of dies each adapted to receive an article, means common to all the dies operative for simultaneously trimming the edges of the articles on all the dies, and means independently co-operating with each die for shaping parts of said articles whilst each article is on its respective die.

7. In apparatus for trimming and shaping hollow articles, the combination of a plurality of dies each adapted to receive an article, cutters for trimming the edges of the articles on the dies, a carrier in which all of the cutters are mounted operative to simultaneously actuate all of the cutters, and means independently co-operating with each die for simultaneously shaping parts of said articles while each article is on its respective die.

8. In apparatus for trimming and shaping hollow articles, the combination of a plurality of separated dies each adapted to receive an article, means for successively trimming the edges of and shaping parts of said articles whilst each article is on its respective die, means for first feeding articles to said dies in close formation, and means for subsequently feeding said articles in spaced relation corresponding to the separation of the dies.

9. In apparatus for trimming and shaping hollow articles, the combination of a plurality of separated dies each adapted to receive an article, means for successively trimming the edges of and shaping parts of said articles whilst each article is on its respective die, means for feeding articles to and placing them on said dies, and means acting within the articles for removing same from the dies after treatment.

10. In apparatus for trimming and shaping hollow articles, the combination of a plurality of dies each adapted to receive an article, means for successively trimming the edges of and shaping parts of said articles whilst each article is on its respective die, means for placing the articles onto the dies, and means for removing the articles from the dies after treatment, the trimming, shaping, placing and removing means each acting simultaneously on the plurality of articles during their respective functions.

11. In apparatus for trimming and shaping hollow articles, the combination of a plurality of dies each adapted to receive an article, means for simultaneously placing articles on said dies, means for simultaneously trimming the edge of said articles, means for simultaneously shaping parts of said articles, and means acting within the articles for simultaneously removing the articles from the dies.

12. In apparatus for trimming and shaping hollow articles, the combination of a plurality of separated dies each adapted to receive an article, means for feeding articles in close formation, means for subsequently feeding said articles in spaced relation corresponding to the separation of the dies, means for transferring the articles from the last mentioned feeding means onto the dies, means for trimming the edges of the articles, and means for shaping parts of the articles, said trimming and shaping means acting in succession on the same article whilst on its respective die and simultaneously on a plurality of receptacles on the plurality of dies.

13. In apparatus for trimming and shaping hollow articles, the combination of a plurality of separated dies each adapted to receive an article, means for feeding articles in close formation, means for subsequently feeding said articles in spaced relation corresponding to the separation of the dies, means for transferring the articles from the last mentioned feeding means onto the dies, means for trimming the edges of the articles, means for shaping parts of the articles, said trimming and shaping means acting in succession on the same article whilst on its respective die and simultaneously on a plurality of receptacles on the plurality of dies, and means for shifting the articles on the dies after trimming to bring them into operative relation with the shaping means.

14. In apparatus for trimming and shaping hollow articles, the combination of a plurality of separated dies each adapted to receive an article, means for feeding articles in close formation, means for subsequently feeding said articles in spaced relation corresponding to the separation of the dies, means for transferring the articles from the last mentioned feeding means onto the dies, means for trimming the edges of the articles, means for shaping parts of the articles, said trimming and shaping means acting in succession on the same article whilst on its respective die and simultaneously on a plurality of receptacles on the plurality of dies, and means acting within the articles and extending through the dies for removing the articles from the dies after treatment.

15. In apparatus for trimming and shaping hollow articles, the combination of a plurality of separated dies each adapted to receive an article, means for feeding articles in close formation, means for subsequently feeding said articles in spaced relation corresponding to the separation of the dies, means for transferring the articles from the last mentioned feeding means onto the dies, means for trimming the edges of the articles, means for shaping parts of the articles, said trimming and shaping means acting in succession on the same article whilst on its respective die and simultaneously on a plurality of receptacles on the plurality of dies, and means acting within the articles and extending through the dies for removing the articles from the dies after treatment, said removing means acting also to shift the articles or the dies between the trimming and shaping operations.

16. In apparatus for trimming and shaping hollow articles, the combination of a die adapted to receive an article with an edge overhanging same, means for trimming said edge comprising an angularly reciprocating knife having an aperture to receive said edge, and means for operating said knife whereby it is first moved in one direction to trim one part of the article, then reversed for double the first movement to trim the remainder thereof, and finally again moved in the first mentioned direction for half the extent of the second movement to bring it to normal position to receive another article.

17. In apparatus for trimming and shaping hollow articles, the combination of a die adapted to receive an article with an edge overhanging same, means for trimming said edge comprising an angularly reciprocating knife having an aperture to receive said edge, means for operating said knife whereby it is first moved in one direction to trim one part of the article, then reversed for double the first movement to trim the remainder thereof, and finally again moved in the first mentioned direction for half the extent of the second movement to bring it to normal position to receive another article, and means adjacent the die for receiving and separating the material trimmed from the article.

18. In apparatus for trimming and shaping hollow articles, the combination of a die adapted to receive an article, means for trimming the edge of said article whilst on said die, comprising an angularly reciprocating knife adapted to trim first one part of the receptacle and be then reversed to trim the remainder, and means for shaping parts of said articles also while the same is on said die.

19. In apparatus for trimming and shaping hollow articles, the combination of a die adapted to receive an article, means for trimming the edge of said article whilst on said die, comprising an angularly reciprocating knife adapted to trim first one part of the receptacle and be then reversed to trim the remainder, and co-operating tools adapted to shape parts of said article also while the same is on said die.

20. In apparatus for trimming and shaping hollow articles, the combination of a die adapted to receive an article, means for trimming the edge of said article whilst on said die, comprising an angularly reciprocating knife adapted to trim first one part of the receptacle and be then reversed to trim the remainder, and co-operating tools certain of which are carried by the die for shaping parts of said articles also whilst the same is on the die.

21. In apparatus for trimming and shaping hollow articles, the combination of a die adapted to receive an article with an edge overhanging same, means for trimming said edge comprising an angularly reciprocated knife having an aperture to receive said edge of the article, means for operating said knife whereby it is first moved in one direction to trim one part of the article, and then reversed to trim the remainder, means for placing the article on the die, and means acting within the article and extending through the die for removing the article therefrom after trimming.

22. In apparatus for trimming and shaping hollow articles, the combination of a plurality of dies each adapted to receive an article with an edge overhanging same, means for simultaneously trimming the edges of the articles whilst on said dies, comprising an angularly reciprocated knife having apertures through which the edges of the articles extend, means for operating said knife whereby it is first moved in one direction to trim one part of the articles and then reversed to trim the remainder, and means for simultaneously shaping parts of said articles also whilst the latter are on said dies.

23. In apparatus for trimming and shaping hollow articles, the combination of a plurality of dies each adapted to receive an article with an edge overhanging same, means for simultaneously trimming the edges of the articles whilst on said dies comprising an angularly reciprocated knife having apertures through which the edges of the articles extend, means for operating said knife whereby it is first moved in one direction to trim one part of the article and then reversed to trim the remainder, means for simultaneously shaping parts of said articles also whilst the latter are on said dies, means for feeding the articles to said dies and means for removing them therefrom after trimming and shaping.

24. In apparatus for trimming and shaping hollow articles, the combination of a plurality of separated dies each adapted to receive an article with an edge overhanging same, means for simultaneously trimming the edges of the articles whilst on said dies, comprising an angularly reciprocated knife having apertures through which the edges of the articles extend, means for operating said knife whereby it is first moved in one direction to trim one part of the articles and then reversed to trim the remainder, means for simultaneously shaping parts of said articles also whilst the latter are on said dies, means for feeding the articles in spaced relation to said dies, and means acting within the articles and extending through the dies for removing said articles from the dies after trimming and shaping.

25. In apparatus for trimming and shaping hollow articles, the combination of a plurality of separated dies each adapted to receive an article with an edge overhanging same, means for simultaneously trimming the edges of the articles whilst on said dies, comprising an angularly reciprocated knife having apertures through which the edges of the articles extend, means for operating said knife whereby it is first moved in one direction to trim one part of the article and then reversed to trim the remainder, means for simultaneously shaping parts of said articles also whilst the latter are on said dies, means for feeding the articles in spaced relation to said dies, and means acting within the articles and extending through the dies for removing said articles from the dies after trimming and shaping, said removing means also acting to shift the articles on the dies between the trimming and shaping operations to bring parts of the articles into operative relation with the shaping means.

26. In apparatus for trimming and shaping hollow articles, the combination of a die adapted to receive an article, means for shaping parts of said article whilst on said die, comprising a tool on the die and another reciprocating tool co-operating therewith, and means contained within the articles and extending through the die for removing the article therefrom after treatment.

27. In apparatus for trimming and shaping hollow articles, the combination of a plurality of dies each adapted to receive an article, means for simultaneously shaping parts of said articles whilst on said dies, comprising tools on the dies and other reciprocating tools co-operating therewith, and means contained within the articles and extending through said dies for removing the articles therefrom after shaping.

28. In apparatus for trimming and shaping hollow articles, the combination of a die adapted to receive an article, means for shaping parts of said article whilst on said die, comprising a tool on the die and another reciprocating tool co-operating therewith, and means contained within the articles and extending through the die for removing the article therefrom after treatment, said removing means also acting to position the article on the die to bring the parts to be acted on into proper relation with the shaping tools.

29. In apparatus for trimming and shaping hollow articles, the combination of a plurality of separated dies each adapted to receive an article, means for feeding articles to said dies in spaced relation corresponding to the separation of the dies, means for simultaneously shaping parts of said articles whilst on said dies, comprising tools on the latter and other reciprocating tools co-operating therewith, and means contained within the articles and extending through said dies for removing the articles therefrom after shaping.

30. In apparatus for trimming and shaping hollow articles, a die adapted to receive an article including a fixed element and elements movable laterally of the fixed element, and means to co-operate with said die for shaping parts of said article while on said die, said shaping means co-operating with the movable elements of the die to shift the article relative to the fixed element of the die in effecting the shaping of the article.

31. In apparatus for trimming and shaping hollow articles, a die adapted to receive an article including a fixed element and a plurality of elements movable relative to the fixed element, and means for shaping parts of said article while on said die, comprising a tool on the fixed element of the die, and a reciprocating tool co-operating therewith and co-operating with the movable die elements to shift the article relative to the fixed die element and the tool carried thereby to effect the shaping of the article.

32. In apparatus for trimming and shaping hollow articles, a die adapted to receive an article and including a fixed die element and a plurality of movable die elements, means for simultaneously shaping parts of an article on said die, said shaping means co-operating with the movable elements of the die to shift the same with the article relative to the fixed die element to effect the shaping operation, and means carried by the fixed die element within the article and operative for removing the article from the die after shaping.

33. In apparatus for trimming and shaping hollow articles, a die adapted to receive an article and including a fixed die element and a plurality of die elements movable relative to the fixed die element, means for conveying and positioning articles relative to said die, means for delivering an article from said conveying means to the die, means co-operating with the fixed die element for shaping parts of the article on said die, said shaping means co-operating to shift the movable die elements and the article relative to the fixed die element and hold it firmly during the shaping operation, and means contained within the article and extending through the fixed element of the die for removing the article from the die after shaping.

34. In apparatus for trimming and shaping hollow articles, a plurality of dies each adapted to receive an article and including a fixed element and a plurality of elements movable relative to the fixed die element, means for conveying articles to said dies first in close formation and subsequently positioning the articles in spaced relation relative to said dies, means for transferring the articles from the conveying means to the dies, cutters for simultaneously trimming the edges of the articles on said dies, a carrier for said cutters, means for moving said cutter carrier in one direction to trim one part of the articles and then in reverse direction to trim the remainder, means operative in sequence with the cutters for simultaneously shaping parts of said articles on the same dies, co-operating tools operative to shift the movable elements of the dies and the articles relative to the fixed element of the dies during the shaping operation and while maintaining the articles firmly on the dies, and means normally contained within a portion of the fixed die element engaging in the articles and extending through the dies operative for removing articles from the dies after trimming and shaping, said removing means acting also to shift the articles on the dies between the trimming and shaping operation.

In witness whereof I have signed this specification.

GEORGE WILLIAM BERRY.